United States Patent [19]

Okamoto

[11] Patent Number: 5,837,393
[45] Date of Patent: Nov. 17, 1998

[54] FUEL BATTERY SYSTEM

[75] Inventor: Takafumi Okamoto, Wako, Japan

[73] Assignee: Honda Giken Kogyo Kabushiki Kaisha, Tokyo, Japan

[21] Appl. No.: 704,018

[22] Filed: Aug. 30, 1996

[30]     Foreign Application Priority Data

Aug. 30, 1995   [JP]   Japan ................................ 7-221898

[51] Int. Cl.⁶ ............................................ H07M 8/06
[52] U.S. Cl. ......................................... 429/20; 429/30
[58] Field of Search ............................ 429/20, 21, 30

[56]             References Cited

U.S. PATENT DOCUMENTS 3,615,164  10/1971  Baker et al. .
4,946,750   8/1990  Nomden .................. 429/20 X
5,248,566   9/1993  Kumar et al. ............... 429/19
5,270,127  12/1993  Koga et al. ............. 429/20 X

OTHER PUBLICATIONS

Search Report (Searched Oct. 1996).

*Primary Examiner*—Stephen Kalafut
*Attorney, Agent, or Firm*—Lyon & Lyon LLP

[57]               ABSTRACT

A fuel cell system has a fuel cell assembly and an oxygen-containing gas supply. The oxygen-containing gas supply has a passage for introducing atmospheric air, and includes a catalytic converter for selectively oxidizing carbon monoxide contained in the air introduced into the passage, an air compressor, and an intercooler. The catalytic converter, the air compressor, and the intercooler are successively disposed in the passage. The air from which carbon monoxide has been removed by the catalytic converter is supplied as an oxidizing gas to the fuel cell assembly.

19 Claims, 3 Drawing Sheets

FUEL BATTERY SYSTEM

BACKGROUND OF THE INVENTION

1. Field of the Invention

The present invention relates to a fuel cell system having fuel cells which generate electric energy by consuming a fuel gas such as a hydrogen gas or the like.

2. Description of the Related Art

There have been developed fuel cells systems having a plurality of stacked fuel cells alternating with separators, each of the fuel cells comprising a solid polymer electrolyte membrane sandwiched between an anode and a cathode. It has been practiced in the art to use such fuel cell systems as power unit cells for propelling mobile bodies including four-wheeled motor vehicles and motorcycles and operating other electrically operated machines such as portable generators.

In the fuel cell, the anode is supplied with a hydrogen gas (fuel gas) generated by reforming methanol with steam, whereas the cathode is supplied with an oxidizing gas (air). The hydrogen gas supplied to the anode is ionized and flows through the solid polymer electrolyte membrane to generate electric energy that will be discharged from the fuel cell.

If the fuel cell system is used as a power unit cell on a mobile body, then carbon monoxide (CO) contained in the exhaust gases emitted from engine-propelled automobiles tends to be supplied, together with the oxidizing gas, to the cathode. When the four-wheeled motor vehicle or the motorcycle is running in a tunnel and/or positioned behind a truck or the like powered by a diesel engine while in a traffic jam, the concentration of the carbon monoxide supplied to the cathode of the fuel cell is very high. Therefore, the electrode catalyst of the fuel cell is damaged by the supplied carbon monoxide. It has been known in the art that, in the fuel cell which uses the solid polymer electrolyte membrane, the electrode catalyst is damaged by the carbon monoxide and the performance of the fuel cell is greatly lowered even when the concentration of the supplied carbon monoxide is of about 10 ppm.

SUMMARY OF THE INVENTION

It is therefore an object of the present invention to provide a fuel cell system which is capable of supplying air, from which carbon monoxide has reliably been removed, as an oxidizing gas to fuel cells, and which is of a simple structure.

To achieve the above object, according to the present invention, when atmospheric air is introduced into a passage leading to a cathode of a fuel cell assembly, carbon monoxide contained in the introduced atmospheric air is selectively oxidized by a catalytic converter. Therefore, it is possible to remove carbon monoxide reliably from the air that is supplied as an oxidizing gas to the cathode for thereby effectively preventing the cathode from being damaged by the carbon monoxide.

The above and other objects, features, and advantages of the present invention will become more apparent from the following description when taken in conjunction with the accompanying drawings in which preferred embodiments of the present invention are shown by way of example.

DETAILED DESCRIPTION OF THE PREFERRED EMBODIMENTS

Figure 1:
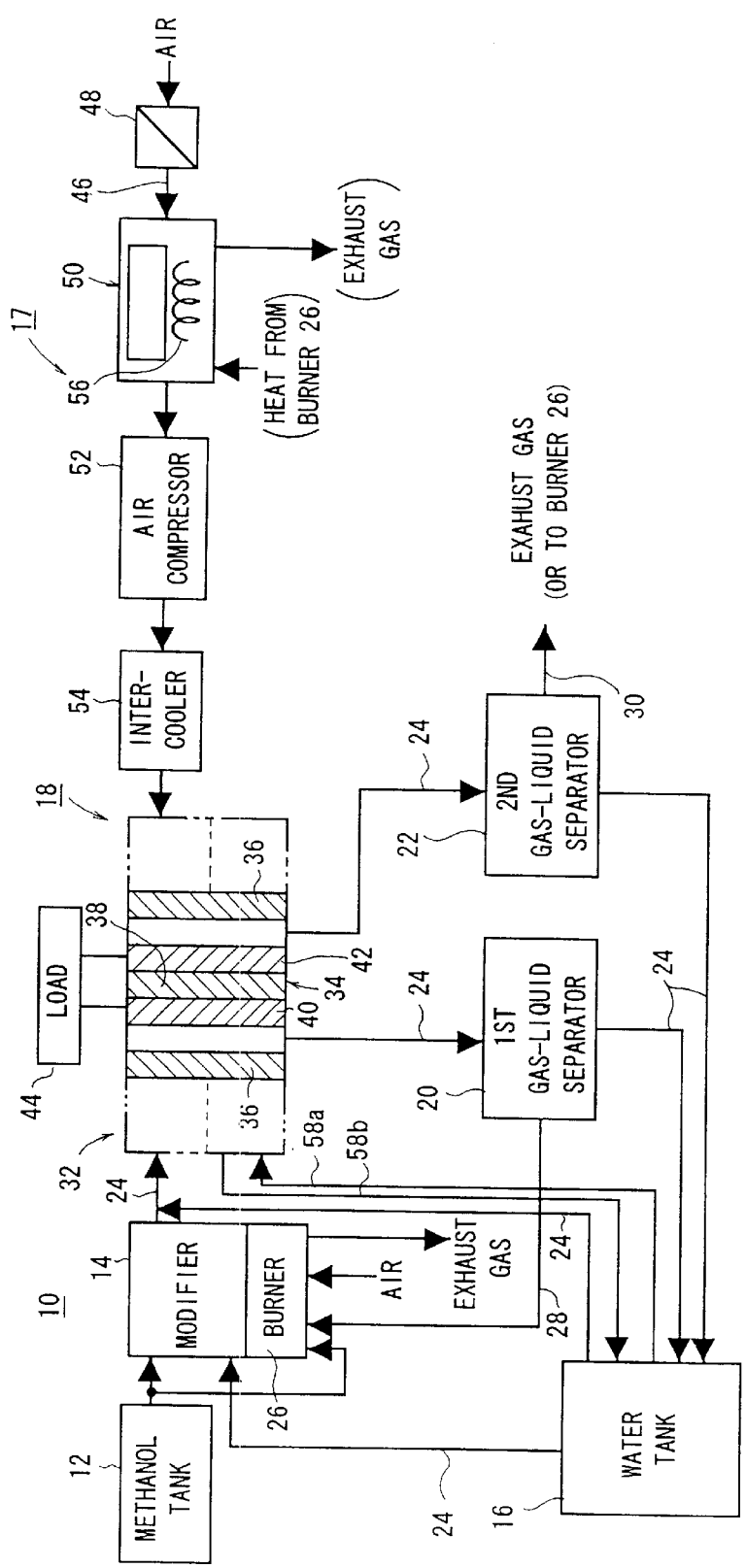
FIG. 1 is a block diagram of a fuel cell system according to a first embodiment of the present invention.

As shown in FIG. 1, a fuel cell system 10 according to a first embodiment of the present invention comprises a reformer 14 for reforming, with steam, methanol ($CH_3OH$) supplied from a methanol tank 12, a water tank 16 for supplying water to the reformer 14 and supply water to humidify a hydrogen gas (fuel gas) and a carbon dioxide gas which are delivered from the reformer 14, an oxygen-containing gas supply 17 for introducing air (oxidizing gas) from the atmosphere and removing carbon monoxide from the introduced air, a fuel cell assembly 18 which is supplied with the hydrogen gas and the carbon dioxide gas that have been humidified and also with the air from which carbon monoxide has been removed, and a pair of first and second gas-liquid separators 20, 22 for separating a discharged material emitted from the fuel cell assembly 18 into a gas and water and supplying the separated water back to the water tank 16.

The water tank 16, the reformer 14, the fuel cell assembly 18, and the first and second gas-liquid separators 20, 22 are connected by passages 24.

The reformer 14 has a burner 26 which is supplied with unreacted hydrogen, carbon dioxide, etc. from the first gas-liquid separator 20 through a passage 28, and also with unreacted oxygen, nitrogen, etc. from the second gas-liquid separator 22 through a passage 30. Each of the first and second gas-liquid separators 20, 22 comprises a cooling unit such as a radiator, for example.

The fuel cell assembly 18 comprises a plurality of stacked fuel cells 32 each comprising a unit cell structural body 34 and a pair of separators 36 sandwiching the unit cell structural body 34. The unit cell structural body 34 comprises a solid polymer electrolyte membrane 38, a hydrogen electrode (anode) 40 disposed on one side of the solid polymer electrolyte membrane 38, and an air electrode (cathode) 42 disposed on the other side of the solid polymer electrolyte membrane 38. The anode 40 and the cathode 42 are connected to a load 44 such as an electric motor or the like.

The oxygen-containing gas supply 17 has a passage 46 for connecting the fuel cell assembly 18 to the atmosphere. As shown schematically in FIG. 1, one end of the passage 46 comprises an air inlet through which air is introduced into the passage 46, and the other end of the passage 46 is connected to the cathode-side of the fuel cell assembly 18. In the passage 46, between the air inlet and the fuel cell assembly 18, are disposed a filter 48, a catalytic converter 50, an air compressor 52, and an intercooler 54 which are disposed in series in the passage 46 successively in the order named toward the fuel cell assembly 18.

The catalytic converter 50 has a catalyst of a noble metal such as Pt, Ru, Ph, Pd, or their alloy for selectively oxidizing carbon monoxide contained in the air which is introduced into the passage 46. The catalytic converter 50 oxidizes air at a temperature ranging from 100° to 200° C., and has a heater 56 for heating the catalyst. Alternatively, the heater 56 may be dispensed with, and heat discharged from the burner 26 of the reformer 14 may be used to heat the catalyst.

Each of the separators 36 of the fuel cell assembly 18 has pores (not shown) for delivering a hydrogen gas and air therethrough toward the unit cell structural body 34, and also a cooling space (not shown) which communicates with the water tank 16 through passages 58a, 58b.

Operation of the fuel cell system 10 will be described below.

Methanol is supplied from the methanol tank 12 to the reformer 14, and water is supplied from the water tank 16 to the reformer 14 for reforming the methanol with steam while being heated by the burner 26. When the fuel cell system 10 is started, methanol is also supplied to the burner 26.

After the methanol is reformed with steam, water from the water tank 16 is added to the methanol. The reformer 14 now supplies the anode 40 of the unit cell structural body 34 with a humidified working gas including a hydrogen gas and a carbon dioxide gas.

In the oxygen-containing gas supply 17, air is introduced from the passage 46 which is open to the atmosphere, filtered by the filter 48, and then supplied to the catalytic converter 50. In the catalytic converter 50, the catalyst is heated to a temperature ranging from 100° to 200° C. by the heater 56 (or the heat from the burner 26) to selectively oxidize carbon monoxide contained in the air supplied to the catalytic converter 50. The air whose carbon monoxide concentration has been reduced is compressed by the air compressor 52, adjusted to a desired temperature by the intercooler 54, and then supplied to the cathode 42 of the unit cell structural body 34.

In each of the fuel cells 32 of the fuel cell assembly 18, the hydrogen gas contained in the working gas is ionized and flows through the solid polymer electrolyte membrane 38 toward the cathode 42. The hydrogen ions react with oxygen and electrons in the cathode 42, generating water. A discharged component emitted from the anode 40 is introduced into the first gas-liquid separator 20, and separated into a gas and water thereby. A discharged component emitted from the cathode 42 is introduced into the second gas-liquid separator 22, and separated into a gas and water thereby. The water collected by the first and second gas-liquid separators 20, 22 is supplied through the passages 24 back to the water tank 16.

An unreacted hydrogen gas, a carbon dioxide gas, and uncollected water which are separated by the first gasliquid separator 20 are introduced through the passage 28 into the burner 26, which burns the supplied gases to heat the catalyst of the reformer 14. An unreacted oxygen gas, a nitrogen gas, and uncollected water which are separated by the second gas-liquid separator 22 are discharged through a passage 30 or, if necessary, supplied to the burner 26.

If the fuel cell system 10 is used as a power unit cell for propelling a four-wheeled motor vehicle or a motorcycle, then carbon monoxide contained in exhaust gases emitted from the engines on engine-propelled automobiles tends to be introduced into the fuel cell assembly 18 through the passage 46. When the four-wheeled motor vehicle or the motorcycle is running in a tunnel and/or positioned behind a truck or the like powered by a diesel engine while in a traffic jam, the concentration of the carbon monoxide introduced through the passage 46 is very high.

According to the first embodiment, air introduced through the passage 46 is supplied to the catalytic converter 50, which selectively oxidizes carbon monoxide contained in the supplied air. Therefore, the carbon monoxide contained in the air supplied as an oxidizing gas to the cathode 42 is reliably removed, thereby preventing the electrode catalyst, such as of platinum, of the cathode 42 from being damaged by the carbon monoxide. Accordingly, any reduction in the performance of the fuel cell assembly 18 due to damage by the carbon monoxide is effectively avoided.

Figure 2:
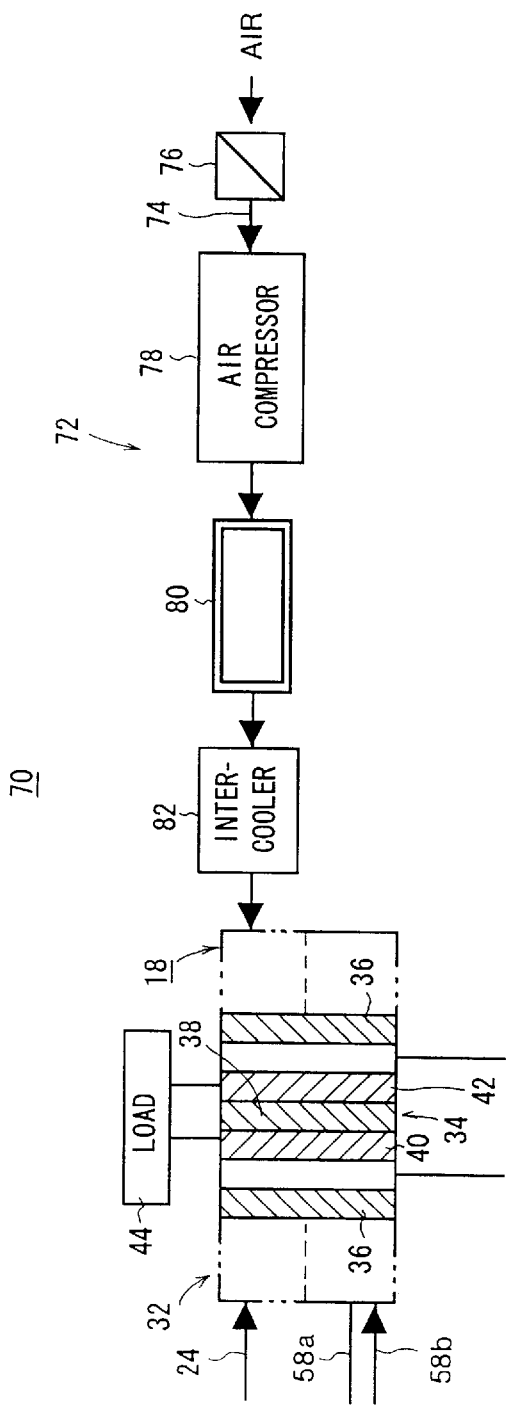
FIG. 2 is a block diagram of a portion of a fuel cell system according to a second embodiment of the present invention.

FIG. 2 fragmentarily shows in block form a fuel cell system 70 according to a second embodiment of the present invention. The fuel cell system 70 includes an oxygen-containing gas supply 72 having a passage 74 (similar to passage 46 of the first embodiment) for connecting a fuel cell assembly 18 to the atmosphere through, a filter 76, an air compressor 78, a catalytic converter 80, and an intercooler 82 which are disposed in series in the passage 74 successively in the order named toward the fuel cell assembly 18.

The catalytic converter 80 has a catalyst of a noble metal such as Pt, Ru, Ph, Pd, or their alloy for selectively oxidizing carbon monoxide contained in the air which is introduced into the passage 74. Since the air compressor 78 is positioned upstream of the catalytic converter 80 with respect to the flow of air through the passage 74, the catalytic converter 80 can utilize air generated when the air is compressed by the air compressor 78 and hence does not require a heater.

Specifically, the air compressed by the air compressor 78 is heated to a temperature in the temperature range for oxidizing carbon monoxide. Therefore, carbon monoxide contained in the air supplied to the catalytic converter 80 is reliably selectively oxidized simply when the air is supplied through the air compressor 78 to the catalytic converter 80.

Other structural details of the fuel cell system 70 are identical to those of the fuel cell system 10 shown in FIG. 1.

Figure 3:
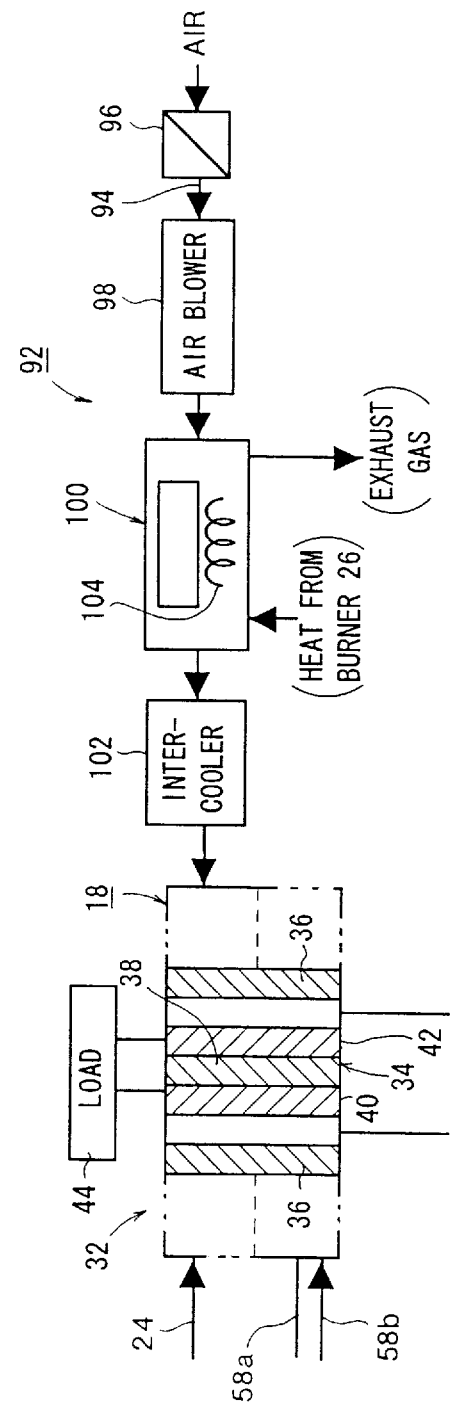
FIG. 3 is a block diagram of a portion of a fuel cell system according to a third embodiment of the present invention.

FIG. 3 fragmentarily shows in block form a fuel cell system 90 according to a third embodiment of the present invention. The fuel cell system 90 includes an oxygen-containing gas supply 92 having a passage 94 (similar to passages 46 and 74 of the first and second embodiments, respectively) for connecting a fuel cell assembly 18 to the atmosphere through, a filter 96, an air blower 98, a catalytic converter 100, and an intercooler 102 which are disposed in series in the passage 94 successively in the order named toward the fuel cell assembly 18. The catalytic converter 100 is of the same structure as the catalytic converter 50 according to the first embodiment, and has its catalyst heated either by a heater 104 or with the heat supplied from the burner 26.

According to the third embodiment, the air compressors 52, 78 according to the first and second embodiments are replaced with the air blower 98 for operating the oxygen-containing gas supply 92 under normal pressure. This arrangement of the third embodiment offers the same advantages as those of the oxidizing gas supplies 17, 72 which operate in pressurized conditions.

In the fuel cell systems according to the present invention, carbon monoxide contained in external air supplied into the passage leading to the cathode of each of the fuel cells is selectively oxidized by the catalytic converter. Therefore, it is possible to reliably remove carbon monoxide contained in the air supplied as an oxidizing gas to the cathode. The electrode catalyst of each of the fuel cells is thus prevented from being damaged by carbon monoxide, and hence any reduction in the performance of the fuel cell system is effectively avoided. If the fuel cell system is used as a power unit cell for propelling a four-wheeled motor vehicle or a motorcycle, then it is possible to effectively eliminate adverse effects which carbon monoxide contained in exhaust gases emitted from the engines on engine-propelled automobiles has on the fuel cell system.

Although certain preferred embodiments of the present invention have been shown and described in detail, it should be understood that various changes and modifications may be made therein without departing from the scope of the appended claims.

What is claimed is:

1. A fuel cell system comprising:
    a fuel cell assembly including a plurality of stacked fuel cells each having an anode, a cathode, and a solid polymer electrolyte membrane sandwiched between said anode and said cathode;
    a fuel gas supply for supplying a fuel gas to the anode of each of the fuel cells through a first passage;
    an oxygen-containing gas supply for supplying an oxidizing gas to the cathode of each of the fuel cells through a second passage, said second passage having an air inlet at one end thereof and being connected to a cathode side of said fuel cell at the other end thereof; and
    a catalytic converter disposed in said second passage between said air inlet and said fuel cell for selectively oxidizing carbon monoxide contained in air introduced into said second passage through said air inlet.

2. A fuel cell system according to claim 1, wherein said catalytic converter has a heating device for heating the catalytic converter at a temperature for oxidizing the carbon monoxide.

3. A fuel cell system according to claim 2, wherein said heating device comprises a heater energizable by electric energy.

4. A fuel cell system according to claim 2, wherein said heating device comprises a burner for supplying heat to the catalytic converter.

5. A fuel cell system according to claim 2, wherein said oxygen-containing gas supply includes an air compressor and an intercooler, and wherein said catalytic converter, said air compressor, and said intercooler are disposed in said second passage successively in the order named, said intercooler being connected to said cathode.

6. A fuel cell system according to claim 5, wherein said catalytic converter has a heater.

7. A fuel cell system according to claim 6, wherein said oxygen-containing gas supply further comprises a filter disposed upstream of said catalytic converter with respect to a flow of the oxidizing gas toward the cathode.

8. A fuel cell system according to claim 1, further comprising a methanol supply system, a reformer, and a water supply system which are connected through said first passage to said anode, said reformer having a burner including an exhaust system connected to said catalytic converter for heating the catalytic converter at a temperature for oxidizing the carbon monoxide.

9. A fuel cell system according to claim 8, wherein said oxygen-containing gas supply further comprises an air filter disposed upstream of said catalytic converter with respect to a flow of the oxidizing gas toward the cathode.

10. A fuel cell system according to claim 1, wherein said oxygen-containing gas supply includes an air compressor and an intercooler, and wherein said air compressor, said catalytic converter, and said intercooler are disposed in said second passage successively in the order named, the arrangement being such that said catalytic converter is heated at a temperature for oxidizing the carbon monoxide when supplied with air which is heated by being compressed by said air compressor.

11. A fuel cell system according to claim 10, wherein said oxygen-containing gas supply further comprises a filter disposed upstream of said air compressor with respect to a flow of the oxidizing gas toward the cathode.

12. A fuel cell system according to claim 1, wherein said oxygen-containing gas supply includes an air blower and an intercooler, and wherein said air blower, said catalytic converter, and said intercooler are disposed in said second passage successively in the order named, said catalytic converter having a heating device for heating the catalytic converter at a temperature for oxidizing the carbon monoxide.

13. A fuel cell system according to claim 12, wherein said heating device comprises a heater energizable by electric energy.

14. A fuel cell system according to claim 13, wherein said heating device comprises a burner for supplying heat to the catalytic converter.

15. A fuel cell system according to claim 14, further comprising a methanol supply system, a reformer, and a water supply system which are connected through said first passage to said anode, said reformer having said burner including an exhaust system connected to said catalytic converter for heating the catalytic converter at a temperature for oxidizing the carbon monoxide.

16. A fuel cell system having an oxidizing air supply passage, an improvement comprising:
    a catalytic converter disposed in the oxidizing air supply passage for selectively oxidizing carbon monoxide contained in air introduced into the oxidizing air supply passage.

17. A fuel cell system according to claim 16, wherein said catalytic converter has a heating device for heating the catalytic converter at a temperature for oxidizing the carbon monoxide.

18. A fuel cell system according to claim 17, wherein said heating device comprises a heater energizable by electric energy.

19. A fuel cell system according to claim 17, wherein said heating device comprises a burner for supplying heat to the catalytic converter.

* * * * *